United States Patent
Chen et al.

(10) Patent No.: US 11,432,301 B2
(45) Date of Patent: Aug. 30, 2022

(54) METHOD AND DEVICE FOR TRANSMITTING CONTROL INFORMATION, AND COMPUTER STORAGE MEDIUM

(71) Applicant: ZTE CORPORATION, Guangdong (CN)

(72) Inventors: Donglei Chen, Guangdong (CN); Shuqiang Xia, Guangdong (CN); Zhisong Zuo, Guangdong (CN); Jing Shi, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 93 days.

(21) Appl. No.: 16/623,335

(22) PCT Filed: Jun. 19, 2018

(86) PCT No.: PCT/CN2018/091832
§ 371 (c)(1),
(2) Date: Apr. 2, 2020

(87) PCT Pub. No.: WO2018/228590
PCT Pub. Date: Dec. 20, 2018

(65) Prior Publication Data
US 2021/0168821 A1    Jun. 3, 2021

(30) Foreign Application Priority Data
Jun. 16, 2017 (CN) .................. 201710459636.6

(51) Int. Cl.
*H04W 72/08* (2009.01)
*H04W 76/27* (2018.01)
(Continued)

(52) U.S. Cl.
CPC .......... *H04W 72/085* (2013.01); *H04L 1/203* (2013.01); *H04W 28/0268* (2013.01);
(Continued)

(58) Field of Classification Search
CPC .......... H04W 72/085; H04W 28/0268; H04W 72/0413; H04W 72/042; H04W 72/0446;
(Continued)

(56) References Cited

U.S. PATENT DOCUMENTS 6,286,104 B1 *  9/2001  Buhle .................. H04L 63/105
                                                  707/999.009
8,743,801 B2 *  6/2014  Englund ............... H04L 1/0027
                                                        370/329
(Continued)

FOREIGN PATENT DOCUMENTS

CN       101064927 A    10/2007
CN       105706381 A     6/2016
(Continued)

OTHER PUBLICATIONS

Extended European Search Report for Application No. 18818521.9, dated Dec. 21, 2020, 8 pages.
(Continued)

*Primary Examiner* — Brian T O'Connor
(74) *Attorney, Agent, or Firm* — Morgan, Lewis & Bockius LLP

(57) ABSTRACT

Provided are a method and device for transmitting control information, and a computer storage medium. The method includes: configuring the control information; and sending the control information, where the control information includes at least one of: configuration information of a PUCCH resource for CQI feedback, resource allocation information for indicating time domain resource allocation, or indication information for indicating whether to send in a data region DCI related to the CQI feedback.

19 Claims, 5 Drawing Sheets

(51) Int. Cl.
*H04L 1/20* (2006.01)
*H04W 28/02* (2009.01)
*H04W 72/04* (2009.01)

(52) U.S. Cl.
CPC ..... *H04W 72/042* (2013.01); *H04W 72/0413* (2013.01); *H04W 72/0446* (2013.01); *H04W 76/27* (2018.02)

(58) Field of Classification Search
CPC ..... H04W 76/27; H04W 72/04; H04W 72/06; H04L 1/203; H04L 5/0057; H04L 5/0094; H04L 1/00; H04L 1/0026; H04L 1/0027
See application file for complete search history.

(56) References Cited

U.S. PATENT DOCUMENTS

| | | | |
|---|---|---|---|
| 9,762,357 | B2* | 9/2017 | Maattanen ............ H04L 5/0055 |
| 10,601,567 | B2* | 3/2020 | Marinier ............ H04W 52/0216 |
| 11,102,762 | B2* | 8/2021 | Baldemair ............ H04L 1/1812 |
| 2012/0218948 | A1 | 8/2012 | Onggosanusi et al. |
| 2016/0352491 | A1 | 12/2016 | Shen et al. |
| 2017/0135092 | A1 | 5/2017 | Seo et al. |
| 2022/0022186 | A1* | 1/2022 | Sahlin ............ H04L 1/1812 |

FOREIGN PATENT DOCUMENTS

| | | |
|---|---|---|
| CN | 106211086 A | 12/2016 |
| KR | 20130039700 A | 4/2013 |
| WO | WO-2017078326 A1 | 10/2016 |

OTHER PUBLICATIONS

Intel Corporation "UCI and DL HARQ-ACK feedback for BB-IoT", 3GPP Draft; R1-160416—Intel NB-IoT UCI_DLHARQ, 3rd Generation Partnership Project (3GPP), Mobile Competence Centre; 650, Route Des Lucioules; F-06921 Sophia-Antipolis Cedex; France, vol./ RAN WG1, no. St Julian's, Malta; Feb. 15, 2016-Feb. 19, 2016 Feb. 14, 2016 (Feb. 14, 2016), XP051053753, Retrieved from the Internet: URL:http//www.3gpp.org/ftp/Meetings_3GPP_SYNC/RAN1/Docs/[retrieved on Feb. 14, 2016].

LG Electronics "Consideration on NR-PUCCH resource allocation", 3GPP Draft; R1-1707644, 3rd Generation Partnership Project (3GPP), Mobile Competence Centre; 650, Route Des Lucioles; F-06921 Sophia-Antipolis Cedex; France, vol. RAN WG1, no. Hangshou; May 15, 2017-May 19, 2017 May 14, 2017 (May 14, 2017) XP051272851, Retrieved from the Internet: URL:http://www.3gpp.org/ftpMeetings_3GPP_SYNC/RAN1/Docs/[retrieved on May 14, 2017].

International Search Report for Application No. PCT/CN2018/091832, dated Sep. 27, 2018, 4 pages.

Chinese Office Action for Application No. 2017104596366, dated Mar. 17, 2022, 14 pages including translation.

Chinese Search Report for Application No. 2017104596366, dated Mar. 11, 2022, 6 pages including translation.

Qualcomm Incorporated, "Resource Allocation for PUCCH" 3GPP TSG RAN WG1 Meeting #89, May 15-19, 2017, Hangzhou, China, R1-1708621, 3 pp.

ZTE, "NR PUCCH resource allocation", 3GPP TSG RAN WG1 Meeting #89, May 15-19, 2017, Hangzhou, China, R1-1707172, 9 pp.

* cited by examiner

METHOD AND DEVICE FOR TRANSMITTING CONTROL INFORMATION, AND COMPUTER STORAGE MEDIUM

CROSS-REFERENCE TO RELATED APPLICATIONS

This is a National Stage Application, filed under 35 U.S.C. 371, of International Patent Application No. PCT/CN2018/091832, filed on Jun. 19, 2018, which claims priority to Chinese patent application No. 201710459636.6 filed on Jun. 16, 2017, contents of both of which are incorporated herein by reference in their entireties.

TECHNICAL FIELD

The present disclosure relates to the field of communications and, in particular, to a method and device for transmitting control information, and a computer storage medium.

BACKGROUND

In discussions on new radio (NR) of the 3rd generation partnership project (3GPP), given performance indicators of ultra-reliable and low latency communication (URLLC) traffic include average latency and reliability. A requirement on the average latency is 0.5 milliseconds (ms), and a requirement on the reliability is that a data packet with a size of 32 bytes transmitted in 1 ms reaches a correct rate of 99.999%. In order to meet the requirement on the reliability of the URLLC, a one-shot transmission and multi-shot transmission based on an adaptive hybrid automatic repeat request (HARQ) are discussed in the 3GPP. The one-shot transmission refers to one-time transmission which can reach the transmission correct rate of 99.999% within 1 ms without HARQ feedback. The multi-shot transmission based on the adaptive HARQ refers to HARQ retransmissions to be combined to reach a reliability indicator of the URLLC. For a manner based on multiple HARQ retransmissions to be combined, a target block error rate (BLER) of each transmission may be different. For example, assuming that the reliability indicator of the URLLC is meet through at most three-shot transmission, the first transmission may use a target BLER of 10%, the second transmission may use a target BLER of 1%, and the third transmission may use a target BLER of 0.1%. For different target BLERs, a terminal needs to feed back different channel quality indications (CQIs). When downlink data is sent based on different target BLERs, the number of resources to be allocated is different and different resource allocation modes may be used. In addition, a base station may determine, according to URLLC traffic waiting time, a data volume, CQI feedback latency (related to a maximum processing capability of the terminal), an available short physical uplink control channel (PUCCH) resource and the like of each terminal, that the base station does not need to instruct the terminal to feed back information related to the CQI under some conditions.

It can be seen that in the related art, no effective scheme has been proposed for how to transmit control information in the case where a data channel is transmitted based on different target BLERs.

SUMMARY

The present disclosure provides a method and device for transmitting control information, and a computer storage medium, to solve at least the problem in the related art of how to transmit the control information in the case where a data channel is transmitted based on different target BLERs.

The present disclosure provides a method for transmitting control information. The method includes following steps: the control information is configured; the control information is sent. The control information includes at least one of: configuration information of a PUCCH resource for CQI feedback, resource allocation information for indicating time domain resource allocation, or indication information for indicating whether to send in a data region downlink control information (DCI) related to the CQI feedback.

In an embodiment, the PUCCH resource includes a first PUCCH resource and a second PUCCH resource, where a length of the first PUCCH resource is greater than a length of the second PUCCH resource.

In an embodiment, the step in which the control information is sent includes following steps: the first PUCCH resource is sent through radio resource control (RRC) signaling; the second PUCCH resource is sent through higher-layer signaling and/or a downlink control channel.

In an embodiment, after the control information is sent, the method further includes following steps: a CQI periodically fed back by a terminal is received on the first PUCCH resource; or a CQI instantaneously fed back by the terminal is received on the second PUCCH resource.

In an embodiment, the resource allocation information includes a resource allocation header, where the resource allocation header is used for indicating whether the resource allocation information includes information for indicating the time domain resource allocation.

In an embodiment, a determination mode of the time domain resource allocation includes at least one of following modes: the time domain resource allocation is indicated through the information of the time domain resource allocation; or the time domain resource allocation is determined according to a pre-agreed time domain length.

In an embodiment, different types of resource allocation information occupy a same length.

In an embodiment, when the information of the time domain resource allocation is included, the method further includes a following step: frequency domain resource allocation granularity is increased.

In an embodiment, the method further includes a following step: whether to send in the data region the DCI related to the CQI feedback is determined according to indication information related to the CQI feedback in a control region.

In an embodiment, the DCI related to the CQI feedback and sent in the data region includes at least one of: timing information of the CQI feedback, indication information of the PUCCH resource for bearing the CQI feedback, or indication information of a target BLER corresponding to the CQI feedback.

The present disclosure provides a method for transmitting control information. The method includes following steps: the control information is received; communication is performed according to the control information. The control information includes at least one of: configuration information of a PUCCH resource for CQI feedback, resource allocation information for indicating time domain resource allocation, or indication information for indicating whether to send in a data region DCI related to the CQI feedback.

In an embodiment, the PUCCH resource includes a first PUCCH resource and a second PUCCH resource, where a length of the first PUCCH resource is greater than a length of the second PUCCH resource.

In an embodiment, the resource allocation information includes a resource allocation header, where the resource allocation header is used for indicating whether the resource allocation information includes information for indicating the time domain resource allocation.

In an embodiment, the method further includes a following step: whether to send the in the data region DCI related to the CQI feedback is determined according to indication information related to the CQI feedback in a control region.

The present disclosure provides a device for transmitting control information. The device is applied to a base station and includes a configuration module and a sending module. The configuration module is configured to configure the control information, where the control information includes at least one of: configuration information of a PUCCH resource for CQI feedback, resource allocation information for indicating time domain resource allocation, or indication information for indicating whether to send in a data region DCI related to the CQI feedback. The sending module is configured to send the control information.

In an embodiment, the PUCCH resource includes a first PUCCH resource and a second PUCCH resource, where a length of the first PUCCH resource is greater than a length of the second PUCCH resource.

In an embodiment, the sending module includes a first sending unit and a second sending unit. The first sending unit is configured to send the first PUCCH resource through RRC signaling. The second sending unit is configured to send the second PUCCH resource through higher-layer signaling and/or a downlink control channel.

In an embodiment, the resource allocation information includes a resource allocation header, where the resource allocation header is used for indicating whether the resource allocation information includes information for indicating the time domain resource allocation.

In an embodiment, the device further includes a first determination module. The first determination module is configured to determine whether to send in the data region the downlink control information related to the CQI feedback according to indication information related to the CQI feedback in a control region.

The present disclosure provides a device for transmitting control information. The device is applied to a terminal and includes a receiving module and a communication module. The receiving module is configured to receive the control information, where the control information includes at least one of: configuration information of a PUCCH resource for CQI feedback, resource allocation information for indicating time domain resource allocation, or indication information for indicating whether to send in a data region DCI related to the CQI feedback. The communication module is configured to perform communication according to the control information.

In an embodiment, the PUCCH resource includes a first PUCCH resource and a second PUCCH resource, where a length of the first PUCCH resource is greater than a length of the second PUCCH resource.

In an embodiment, the resource allocation information includes a resource allocation header, where the resource allocation header is used for indicating whether the resource allocation information includes information for indicating the time domain resource allocation.

In an embodiment, the device further includes a second determination module. The second determination module is configured to determine whether to send in the data region the DCI related to the CQI feedback according to indication information related to the CQI feedback in a control region.

The present disclosure further provides a computer-readable storage medium, which is configured to store computer programs. The computer programs, when executed by a processor, implement steps of the method for transmitting control information which is applied to a sending side in the present disclosure.

Alternatively, the computer programs, when executed by the processor, implement steps of the method for transmitting control information which is applied to a receiving side in the present disclosure.

The present disclosure further provides a device for transmitting control information. The device includes a processor and a memory for storing computer programs executable on the processor. The processor is configured to execute the computer programs for implementing steps of the method for transmitting control information which is applied to a sending side in the present disclosure.

Alternatively, the processor is configured to execute the computer programs for implementing steps of the method for transmitting control information which is applied to a receiving side in the present disclosure.

According to the present disclosure, the control information is configured, and the control information is sent. The control information includes at least one of: the configuration information of the PUCCH resource for the CQI feedback, the resource allocation information for indicating the time domain resource allocation or the indication information for indicating whether to send in the data region the DCI related to the CQI feedback. That is to say, in a case where the data channel is transmitted based on the different target BLERs, a mechanism for transmitting the control information is proposed to achieve a technical effect of effectively controlling the terminal.

DETAILED DESCRIPTION

The present disclosure will be described hereinafter in detail with reference to the drawings and in conjunction with embodiments. It should be noted that the embodiments of the present application and features of the embodiments may be combined with each other in case of no conflict.

It should be noted that the terms "first", "second" and the like in the description, claims and above drawings of the present disclosure are used for distinguishing between similar objects and are not necessarily used for describing a particular order or sequence.

Figure 1:
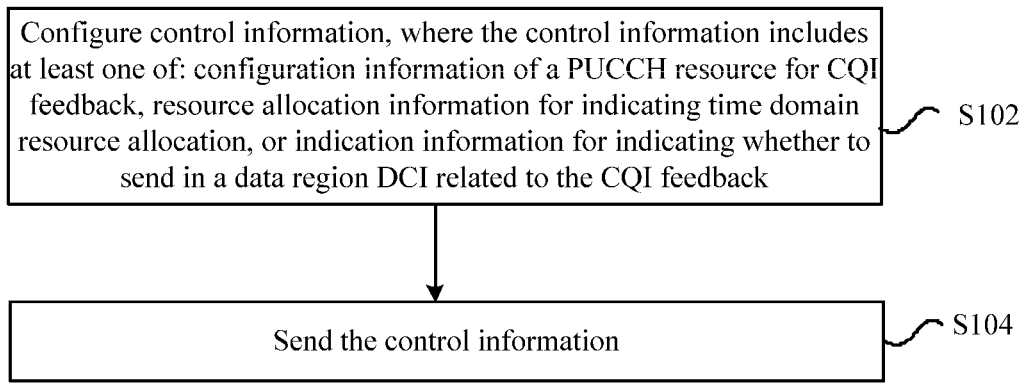
FIG. 1 is a flowchart of a method for transmitting control information according to an embodiment of the present disclosure.

This embodiment provides a method for transmitting control information. FIG. 1 is a flowchart of the method for transmitting control information according to the embodiment of the present disclosure. As shown in FIG. 1, the method includes steps described below.

In a step S102, the control information is configured. The control information includes at least one of: configuration information of a PUCCH resource for CQI feedback, resource allocation information for indicating time domain resource allocation, or indication information for indicating whether to send in a data region DCI related to the CQI feedback.

It should be noted that the PUCCH resource includes a first PUCCH resource and a second PUCCH resource. The length of the first PUCCH resource is greater than the length of the second PUCCH resource.

In a step S104, the control information is sent.

Through the above-mentioned steps, the control information is configured, and the control information is sent. The control information includes at least one of: the configuration information of the PUCCH resource for the CQI feedback, the resource allocation information for indicating the time domain resource allocation, or the indication information for indicating whether to send in the data region the DCI related to the CQI feedback. That is to say, in a case where a data channel is transmitted based on different target BLERs, a mechanism for transmitting the control information is provided to achieve a technical effect of effectively controlling a terminal.

In an embodiment, the above-mentioned steps may, but may not necessarily, be executed by a base station.

In an embodiment, the step S102 and the step S104 may be executed in a reverse order, that is, the step S104 may be executed before the step S102.

This embodiment will be exemplarily described below in conjunction with examples.

In order to reach different target BLERs for a transport block (TB), this example provides a method for feeding back CQIs for different target BLERs. Meanwhile, since the number of resources to be used is different for different target BLERs, different resource allocation modes are used for sending the control information with the same number of information bits. Thereby, control overheads and blind detection times are reduced. In addition, this example proposes introducing an indication about whether to send information related to the CQI feedback into the DCI sent in the control region. The indication is used for indicating whether to send in the data region the control information related to the CQI feedback. That is, the base station configures two different types of PUCCH resources used for the CQI feedback for the terminal. A long PUCCH is used for the CQI feedback of a target BLER of 10%, and a short PUCCH is used for the CQI feedback of a target BLER of 10% or below. The base station configures the long PUCCH resource for the terminal through RRC signaling, and determines the short PUCCH resource through higher-layer signaling and a DCI indication. CQI corresponding to the target BLER of 10% is periodically fed back on the long PUCCH resource.

The base station sends the resource allocation information to the terminal. The resource allocation information includes a resource allocation header. The resource allocation header is used for indicating whether the resource allocation information includes information for indicating the time domain resource allocation. When the resource allocation header indicates that the information of the time domain resource allocation exists, according to a pre-agreed rule, the time domain resource allocation is indicated through the information of the time domain resource allocation. When the resource allocation header indicates that the information of the time domain resource allocation does not exist, according to the pre-agreed rule, data is sent by using an agreed time domain length. The resource allocation information occupies a same length under two different types of resource allocation. When the information of the time domain resource allocation exists, larger frequency domain resource allocation granularity is used for frequency domain resource allocation.

The indication information about whether to send the information related to the CQI feedback is introduced into the DCI sent in the control region. The indication information is used for indicating whether to send in the data region the DCI related to the CQI feedback. The information related to the CQI feedback includes timing information of the CQI feedback, indication information of the PUCCH resource for bearing the CQI feedback and indication information of a target BLER corresponding to the CQI feedback.

In an implementation, the step in which the control information is sent includes following modes: the first PUCCH resource is sent through the RRC signaling; the second PUCCH resource is sent through the higher-layer signaling and/or a downlink control channel.

In an embodiment, after the control information is sent, the method further includes steps described below.

In a step S11, a CQI periodically fed back by the terminal is received on the first PUCCH resource.

Alternatively, in a step S12, a CQI instantaneously fed back by the terminal is received on the second PUCCH resource.

In an embodiment, the resource allocation information includes the resource allocation header. The resource allocation header is used for indicating whether the resource allocation information includes the information for indicating the time domain resource allocation.

A determination mode of the time domain resource allocation includes at least one of following modes: the time domain resource allocation is indicated through the information of the time domain resource allocation, or the time domain resource allocation is determined according to a pre-agreed time domain length.

In an embodiment, different types of resource allocation information occupy a same length.

In an embodiment, when the information of the time domain resource allocation is included, the method further includes a step described below.

In a step S23, the frequency domain resource allocation granularity is increased.

In an implementation, whether to send in the data region the DCI related to the CQI feedback is determined according to the indication information related to the CQI feedback in the control region.

In an embodiment, the DCI related to the CQI feedback and sent in the data region includes at least one of: the timing information of the CQI feedback, the indication information of the PUCCH resource for bearing the CQI feedback, or the indication information of the BLER corresponding to the CQI feedback.

This embodiment will be exemplarily described below in conjunction with following embodiments.

Embodiment 1

Figure 2:
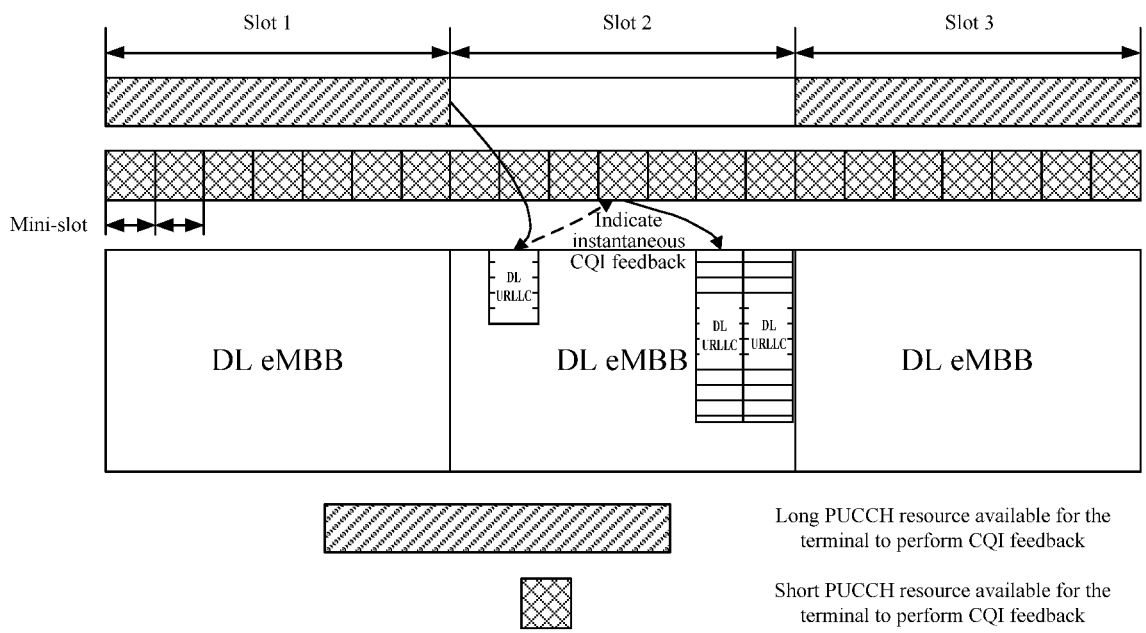
FIG. 2 is a schematic diagram of CQI feedback using a long PUCCH resource and a short PUCCH resource according to an embodiment of the present disclosure.

As shown in FIG. 2, a base station configures two types of PUCCH resources for a URLLC terminal. The two types of PUCCH resources include a long PUCCH resource and a short PUCCH resource. The long PUCCH resource is used for feeding back a CQI for a target BLER of 10%, and the short PUCCH resource is used for feeding back a CQI for a target BLER of 10% or below. The long PUCCH resource is used for periodical CQI feedback, and the short PUCCH resource is used for instantaneous CQI feedback. The long PUCCH resource is used for the periodical CQI feedback, so that a small number of frequency resources are reserved for multiple users to use. In addition, the resources may be shared with a terminal which only supports enhance mobile broadband (eMBB) traffic. In this embodiment, the URLLC terminal performs the periodical CQI feedback on slots 1, 3, 5, . . . , where the number of symbols of the long PUCCH is 14. When the URLLC terminal needs to send downlink data, data transmissions may be performed according to the periodical CQI fed back on the long PUCCH, and within a range allowed by URLLC performance indicators, the base station may notify the terminal to perform rapid CQI feedback on the short PUCCH. The base station determines, according to URLLC traffic waiting time, CQI feedback latency (related to a maximum processing capability of the terminal), an available PUCCH resource and the like of the terminal, a target BLER corresponding to the uplink CQI feedback. After rapidly acquiring an instantaneous CQI, the base station adaptively adjusts a modulation and coding scheme (MCS) to meet the URLLC performance indicators. In this embodiment, the short PUCCH is sent on a mini-slot with the length of two symbols; after receiving a DCI indication sent by the base station, the URLLC terminal feeds back the instantaneous CQI through the short PUCCH on a second mini-slot; after receiving the instantaneous CQI feedback, the base station readjusts the MCS by using anew CQI on a second mini-slot for data retransmission to meet a URLLC indicator, a transmission correct rate of 99.999% in 1 ms. In this embodiment, the base station configures reserved long PUCCH resources and short PUCCH resources for the CQI feedback for the terminal through the higher-layer signaling.

Embodiment 2

A base station performs the first transmission of downlink data for a URLLC terminal according to a CQI, fed back on a long PUCCH, for a target BLER of 10%. At this time, due to a larger target BLER, a small number of resources are consumed, and smaller resource allocation granularity may be used for resource allocation, which is likely to reduce puncturing of resources allocated to an eMBB terminal. After the terminal feeds back a CQI for a smaller target BLER (for example, 1% or 0.1%) based on a short PUCCH, the base station may adjust the length of a data channel for sending URLLC traffic or repeatedly sends multiple mini-slots to reach the target BLER. At this time, larger resource allocation granularity may be used for frequency domain resource allocation. Thereby, a certain number of bits for indicating time domain resource information are saved.

Figure 3:
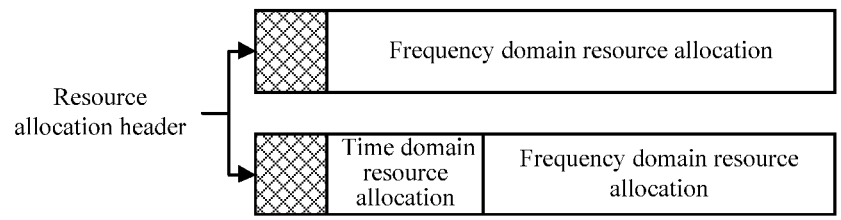
FIG. 3 is a schematic diagram of two different types of resource allocation according to an embodiment of the present disclosure.

As shown in FIG. 3, the length of a resource allocation header is 1 bit and the resource allocation header is used for indicating whether resource allocation information includes information of time domain resource allocation. When 1-bit indication information indicates that the information of the time domain resource allocation is not included, frequency domain resource allocation granularity is one RB, and the time domain resource allocation uses one mini-slot by default. When the 1-bit indication information indicates that the information of the time domain resource allocation is included, 2 bits are included to indicate the time domain resource allocation: "00" corresponds to repeated sending on 2 mini-slots, "01" corresponds to repeated sending on 3 mini-slots, "10" corresponds to repeated sending on 4 mini-slots, and "11" corresponds to repeated sending on 5 mini-slots respectively. In this case, the frequency domain resource allocation granularity used is 4 RBs, that is, a resource block group (RBG) is used as the resource allocation granularity, where the size of the RBG is 4 RBs. The base station may configure a time domain length corresponding to the time domain resource allocation through RRC signaling in advance or pre-agree time domain resource lengths corresponding to indications with different bits in DCI in a standard. In addition, when the time domain resource allocation information exists, the base station may configure the size of the used frequency domain resource allocation granularity through the RRC signaling in advance.

Embodiment 3

When transmission of URLLC data based on an adaptive HARQ cannot be performed due to scheduling waiting time and HARQ feedback latency (determined by a processing capability of a terminal), one-shot transmission is used. At this time, to reach a BLER of 0.001%, data may be repeatedly sent multiple times. Comparing with resource allocation granularity corresponding to a BLER of 10%, resource allocation granularity may be larger, and a time domain resource allocation indication (indicating the number of repeated sending times for repeated sending, and indicating a time domain length of a resource for non-repeated sending) is introduced to support more resources to be used for data transmission.

Figure 4:
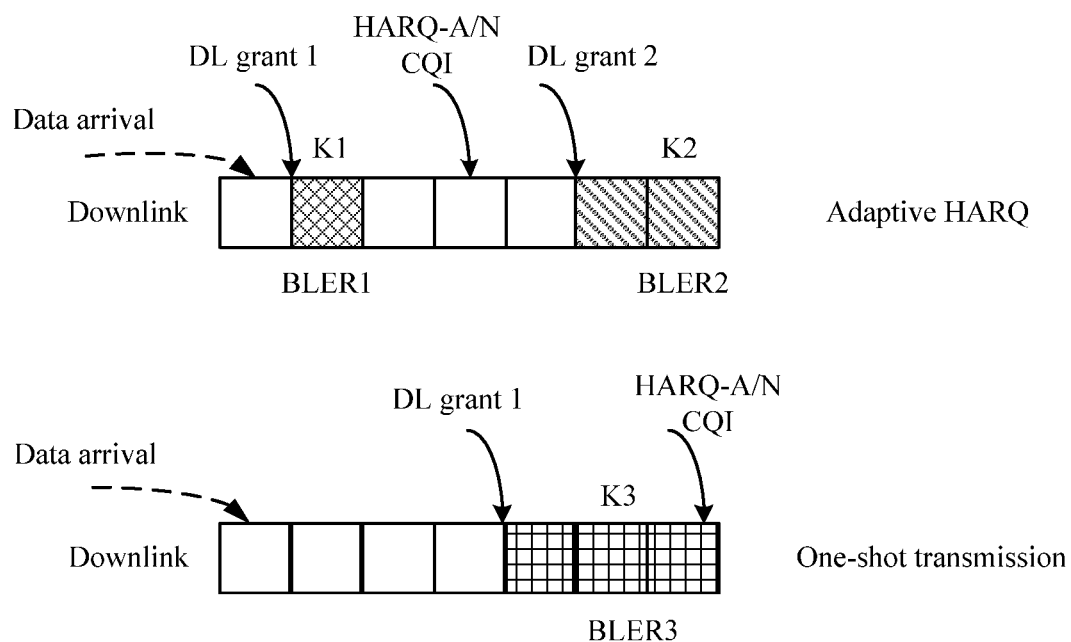
FIG. 4 is a schematic diagram of adaptive HARQ transmission and one-shot transmission according to an embodiment of the present disclosure.

As shown in FIG. 4, for the one-shot transmission, to reach the target BLER of 0.001%, a base station repeatedly sends downlink data on K3 mini-slots. At this time, that resource allocation information includes information of time domain resource allocation needs to be indicated in a resource allocation header, and specific time domain resources for the data transmission are obtained through the information of the time domain resource allocation.

Embodiment 4

Figure 5:
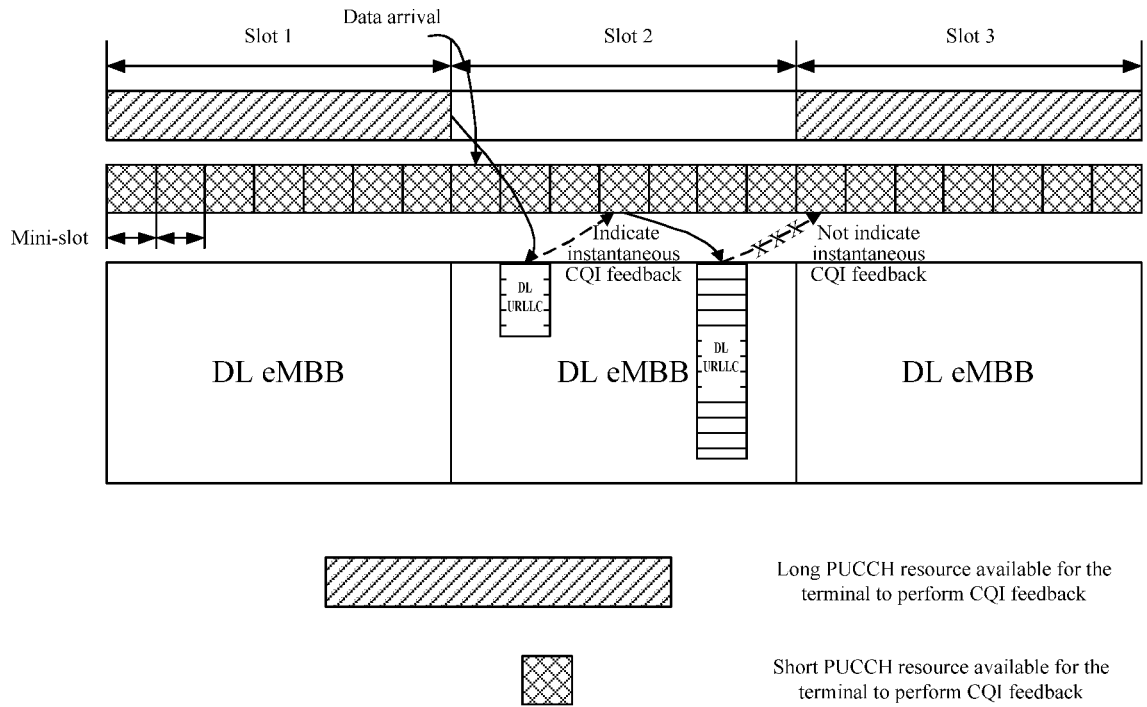
FIG. 5 is a schematic diagram in which a base station determines whether to send DCI related to CQI feedback according to related conditions according to an embodiment of the present disclosure.

Abase station determines, according to URLLC traffic waiting time, a data volume, CQI feedback latency (related to a maximum processing capability of a terminal), an short PUCCH resource available in uplink and the like of each terminal, whether it is necessary to indicate that a CQI is fed back on a particular short PUCCH resource for a specified target BLER through DCI. In this embodiment, as shown in FIG. 5, the base station sends URLLC data on a second mini-slot in downlink slot 2. At this time, the base station needs to send DCI related to CQI feedback to instruct the terminal to perform instantaneous CQI feedback, and adjusts, according to an instantaneous CQI fed back, an MCS on a sixth mini-slot for a retransmission of the same downlink data. However, the terminal is not instructed to perform the instantaneous CQI feedback.

When the instantaneous CQI feedback needs to be performed, the base station dynamically selects to configure CQI feedback for different target BLERs according to available time resources and spectrum efficiency. For example, CQI feedback for a target BLER of 10%, CQI feedback for a target BLER of 1%, or CQI feedback for both the target BLER of 10% and the target BLER of 1%. The instantaneous CQI feedback, which is triggered dynamically through the DCI, will be sent through a certain PUCCH in a PUCCH resource set pre-configured through higher-layer signaling. Since URLLC traffic is relatively sparse, fewer short PUCCH resources may be generally configured to be shared by multiple users. When a URLLC terminal needs to dynamically feedback the CQI for the specified target BLER, the particular short PUCCH resource is specified through the DCI for sending the CQI.

Figure 6:
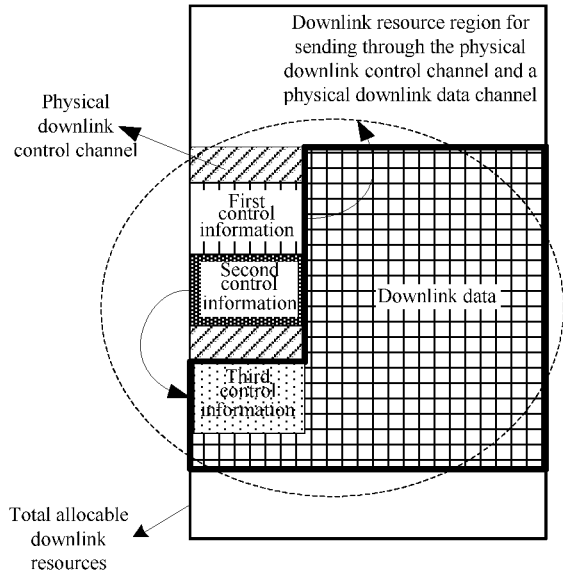
FIG. 6 is a schematic diagram in which control information related to CQI feedback is sent through two levels of DCI according to an embodiment of the present disclosure.

The information related to the CQI feedback and sent in the DCI includes timing information of the CQI feedback, indication information of the PUCCH resource for bearing the CQI feedback and indication information of the CQI feedback for a particular target BLER. Since much information is related to the CQI feedback, and in some cases, the control information does not need to be sent, larger overheads will be caused if the information is sent in the DCI sent in a control region. Since the control information related to the CQI feedback does not affect proper demodulation of data and has a lower reliability requirement than resource allocation and MCS indication information, the control information may be sent in a data region. An indication about whether to send the information related to the CQI feedback is introduced into the DCI sent in the control region. The indication is used for indicating whether to send in the data region the control information related to the CQI feedback, which can reduce the overhead of the DCI sent in the control region. As shown in FIG. 6, first control information includes resource allocation information and MCS indication information, second control information includes indication information related to the CQI feedback, where the indication information is used for indicating whether the control information related to the CQI feedback exists in the data region, and third control information is the control information related to the CQI feedback in the data region. When the second control information indicates that the control information related to the CQI feedback does not exist in the data region, a downlink data region is all used for sending data. The base station agrees in advance to enable the terminal to obtain time-frequency resource information for sending the control information related to the CQI feedback in the downlink data region through RRC signaling and/or a standard.

From the description of the above-mentioned embodiments, it will be apparent to those skilled in the art that the method in the embodiments described above may be implemented by software plus a necessary general-purpose hardware platform, or may of course be implemented by hardware. However, in many cases, the former is a preferred implementation. Based on this understanding, the technical schemes provided by the present disclosure substantially, or the part contributing to the existing art, may be embodied in the form of a software product. The computer software product is stored in a storage medium (such as a read-only memory (ROM)/random access memory (RAM), a magnetic disk or an optical disk) and includes several instructions for enabling a terminal apparatus (which may be a mobile phone, a computer, a server, a network apparatus or the like) to execute the method according to each embodiment of the present disclosure.

Figure 7:
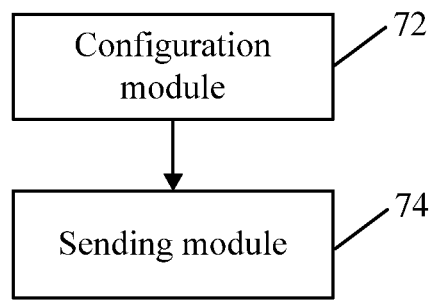
FIG. 7 is a block diagram of a device for transmitting control information according to an embodiment of the present disclosure.

This embodiment further provides a device for transmitting control information. The device is used for implementing the above-mentioned embodiments and implementations. What has been described will not be repeated. As used below, the term "module" may be software, hardware or a combination thereof capable of implementing predetermined functions. The device described in the following embodiments is preferably implemented by software, but implementation by hardware or a combination of software and hardware is also possible and conceived. FIG. 7 is a block diagram of a device for transmitting control information according to an embodiment of the present disclosure. As shown in FIG. 7, the device includes a configuration module 72 and a sending module 74.

(1) The configuration module 72 is configured to configure the control information. The control information includes at least one of: configuration information of a PUCCH resource for CQI feedback, resource allocation information for indicating time domain resource allocation or indication information for indicating whether to send in a data region DCI related to the CQI feedback.

It should be noted that the PUCCH resource includes a first PUCCH resource and a second PUCCH resource. The length of the first PUCCH resource is greater than the length of the second PUCCH resource.

(2) The sending module 74 is configured to send the control information.

The control information is configured and sent by the device shown in FIG. 7. The control information includes at least one of: the configuration information of the PUCCH resource for the CQI feedback, the resource allocation information for indicating the time domain resource allocation or the indication information for indicating whether to send in the data region the DCI related to the CQI feedback. That is to say, a mechanism for transmitting the control information is proposed to solve at least the problem in the related art of how to transmit the control information when a data channel is transmitted based on different target BLERs, achieving a technical effect of effectively controlling a terminal.

Figure 8:
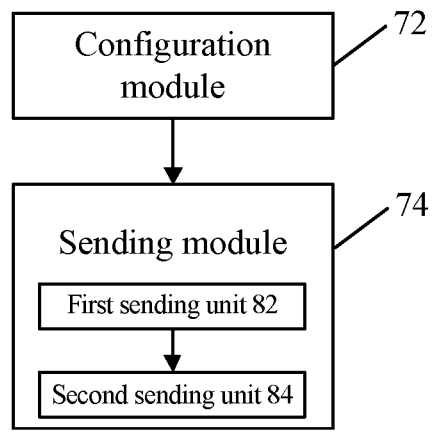
FIG. 8 is block diagram 1 of a device for transmitting control information according to an embodiment of the present disclosure.

FIG. 8 is block diagram 1 of a device for transmitting control information according to an embodiment of the present disclosure. As shown in FIG. 8, the sending module 74 includes a first sending unit 82 and a second sending unit 84.

(1) The first sending unit 82 is configured to send the first PUCCH resource through RRC signaling.

(2) The second sending unit 84 is configured to send the second PUCCH resource through higher-layer signaling and/or a downlink control channel.

In an embodiment, the device further includes a receiving module, which is configured to, after the control information is sent, receive a CQI periodically fed back by the terminal on the first PUCCH resource, or receive a CQI instantaneously fed back by the terminal on the second PUCCH resource.

In an embodiment, the resource allocation information includes a resource allocation header. The resource allocation header is used for indicating whether the resource allocation information includes information for indicating the time domain resource allocation.

A determination mode of the time domain resource allocation includes at least one of following modes: the time domain resource allocation is indicated through the information of the time domain resource allocation, or the time domain resource allocation is determined according to a pre-agreed time domain length.

In an embodiment, different types of resource allocation information occupy a same length.

In an embodiment, when the resource allocation information includes the information of the time domain resource allocation, the device further performs a following operation: frequency domain resource allocation granularity is increased.

In an implementation, the device further includes a first determination module. The first determination module is configured to determine, according to indication information related to the CQI feedback in a control region, whether to send in the data region the DCI related to the CQI feedback.

In an embodiment, the DCI related to the CQI feedback and sent in the data region includes at least one of: timing information of the CQI feedback, indication information of the PUCCH resource for bearing the CQI feedback, or indication information of a target BLER corresponding to the CQI feedback.

It should be noted that when the device for transmitting control information provided by the above-mentioned embodiment transmits the control information, an exemplary description is provided only by the division of the above-mentioned program modules. In practical applications, the above-mentioned processing may be distributed to different program modules for implementation as needed, that is, an internal structure of the device is divided into different program modules to perform all or part of the above-mentioned processing. In addition, the device for transmitting control information in the above-mentioned embodiment has a same concept as the method for transmitting control information in the above-mentioned embodiment, and an implementation process of the device refers to the method embodiments and is not repeated herein.

Figure 9:
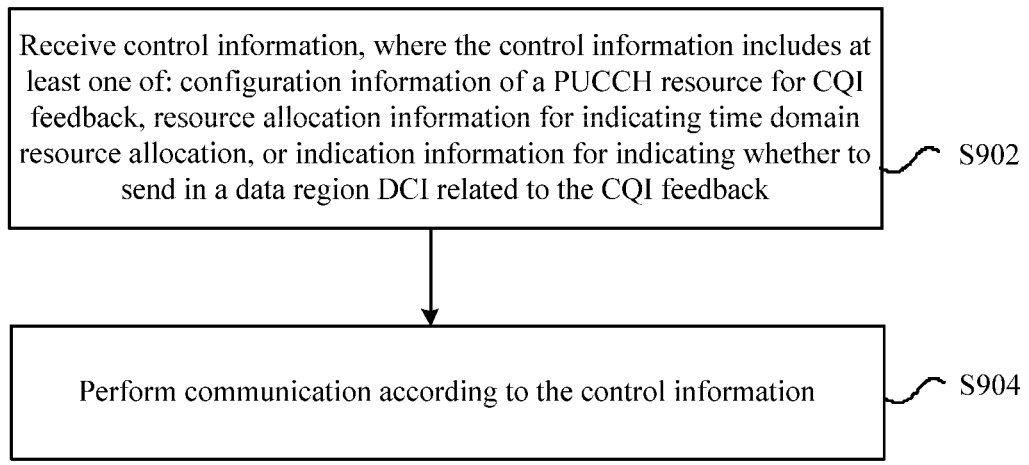
FIG. 9 is a flowchart of another method for transmitting control information according to an embodiment of the present disclosure.

This embodiment further provides a method for transmitting control information. FIG. 9 is a flowchart of another method for transmitting control information according to an embodiment of the present disclosure. As shown in FIG. 9, the method includes steps described below.

In a step S902, the control information is received. The control information includes at least one of: configuration information of a PUCCH resource for CQI feedback, resource allocation information for indicating time domain resource allocation or indication information for indicating whether to send in a data region DCI related to the CQI feedback.

It should be noted that the PUCCH resource includes a first PUCCH resource and a second PUCCH resource. The length of the first PUCCH resource is greater than the length of the second PUCCH resource.

In a step S904, communication is performed according to the control information.

Through the above-mentioned steps, the control information is received and the communication is performed according to the control information. The control information includes at least one of: the configuration information of the PUCCH resource for the CQI feedback, the resource allocation information for indicating the time domain resource allocation, or the indication information for indicating whether to send the in the data region DCI related to the CQI feedback. That is to say, a mechanism for transmitting the control information is proposed to solve at least the problem in the related art of how to transmit the control information when a data channel is transmitted based on different target BLERs, achieving a technical effect of effectively controlling a terminal.

In an implementation, the resource allocation information includes a resource allocation header. The resource allocation header is used for indicating whether the resource allocation information includes information for indicating the time domain resource allocation.

In an implementation, whether to send the DCI related to the CQI feedback in the data region is determined according to indication information related to the CQI feedback in a control region.

From the description of the above-mentioned embodiments, it will be apparent to those skilled in the art that the method in the embodiments described above may be implemented by software plus a necessary general-purpose hardware platform, or may of course be implemented by hardware. However, in many cases, the former is a preferred implementation. Based on this understanding, the technical schemes provided by the present disclosure substantially, or the part contributing to the existing art, may be embodied in the form of a software product. The computer software product is stored in a storage medium (such as a ROM/RAM, a magnetic disk or an optical disk) and includes several instructions for enabling a terminal apparatus (which may be a mobile phone, a computer, a server, a network apparatus or the like) to execute the method according to each embodiment of the present disclosure.

Figure 10:
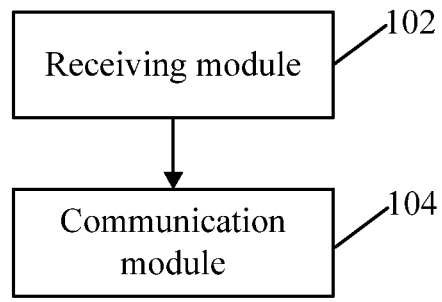
FIG. 10 is a block diagram of another device for transmitting control information according to an embodiment of the present disclosure.

This embodiment further provides a device for transmitting control information. The device is used for implementing the above-mentioned embodiments and implementations. What has been described will not be repeated. As used below, the term "module" may be software, hardware or a combination thereof capable of implementing predetermined functions. The device described in the following embodiment is preferably implemented by software, but implementation by hardware or a combination of software and hardware is also possible and conceived. FIG. 10 is a block diagram of another device for transmitting control information according to an embodiment of the present disclosure. As shown in FIG. 10, the device includes a receiving module 102 and a communication module 104.

(1) The receiving module 102 is configured to receive the control information. The control information includes at least one of: configuration information of a PUCCH resource for CQI feedback, resource allocation information for indicating time domain resource allocation, or indication information for indicating whether to send in a data region DCI related to the CQI feedback.

It should be noted that the PUCCH resource includes a first PUCCH resource and a second PUCCH resource. The length of the first PUCCH resource is greater than the length of the second PUCCH resource.

(2) The communication module 104 is configured to perform communication according to the control information.

The device shown in FIG. 10 receives the control information and performs the communication according to the control information. The control information includes at least one of: the configuration information of the PUCCH resource for the CQI feedback, the resource allocation information for indicating the time domain resource allocation, or the indication information for indicating whether to send in the data region the DCI related to the CQI feedback. That is to say, a mechanism for transmitting the control information is proposed to solve at least the problem in the related art of how to transmit the control information when a data channel is transmitted based on different target BLERs, achieving a technical effect of effectively controlling a terminal.

In an implementation, the resource allocation information includes a resource allocation header. The resource allocation header is used for indicating whether the resource allocation information includes information for indicating the time domain resource allocation.

In an implementation, the device further includes a second determination module. The second determination module is configured to determine, according to indication information related to the CQI feedback in a control region, whether to send in the data region the DCI related to the CQI feedback.

It should be noted that when the device for transmitting control information provided by the above-mentioned embodiment transmits the control information, an exemplary description is provided only by the division of the above-mentioned program modules. In practical applications, the above-mentioned processing may be distributed to different program modules for implementation as needed, that is, an internal structure of the device is divided into different program modules to perform all or part of the above-mentioned processing. In addition, the device for transmitting control information in the above-mentioned embodiment has a same concept as the method for transmitting control information in the above-mentioned embodiment, and an implementation process of the device refers to the method embodiments and is not repeated herein.

The embodiments of the present disclosure further provide a computer-readable storage medium configured to store computer programs. The computer programs, when executed by a processor, implement the method according to any one of the above-mentioned embodiments.

In an embodiment, when the computer-readable storage medium is disposed on a sending side such as a base station, the computer programs, when executed by the processor, implement following steps: control information is configured, where the control information includes at least one of configuration information of a PUCCH resource for CQI feedback, resource allocation information for indicating time domain resource allocation, or indication information for indicating whether to send in a data region DCI related to the CQI feedback; the control information is sent. The PUCCH resource includes a first PUCCH resource and a second PUCCH resource. The length of the first PUCCH resource is greater than the length of the second PUCCH resource.

In an embodiment, the computer programs, when executed by the processor, implement following steps: the first PUCCH resource is sent through RRC signaling; the second PUCCH resource is sent through higher-layer signaling and/or a downlink control channel.

In an embodiment, the computer programs, when executed by the processor, implement following steps: after the control information is sent, a CQI periodically fed back by a terminal on the first PUCCH resource is received, or a CQI instantaneously fed back by the terminal on the second PUCCH resource is received.

In an embodiment, the computer programs, when executed by the processor, implement a following step: when the resource allocation information includes the information of the time domain resource allocation, the frequency domain resource allocation granularity is increased.

In an embodiment, the computer programs, when executed by the processor, implement a following step: whether to send in the data region the DCI related to the CQI feedback is determined according to indication information related to the CQI feedback in a control region.

In an embodiment, when the computer-readable storage medium is disposed on a receiving side such as a terminal, the computer programs, when executed by the processor, implement following steps: control information is received, where the control information includes at least one of the configuration information of the PUCCH resource for the CQI feedback, the resource allocation information for indicating the time domain resource allocation, or the indication information for indicating whether to send in the data region the DCI related to the CQI feedback; communication is performed according to the control information. The PUCCH resource includes the first PUCCH resource and the second PUCCH resource. The length of the first PUCCH resource is greater than the length of the second PUCCH resource.

In an embodiment, the computer programs, when executed by the processor, implement a following step: whether to send in the data region the DCI related to the CQI feedback is determined according to the indication information related to the CQI feedback in the control region.

The embodiments of the present disclosure further provide a device for transmitting control information. The device includes a processor and a memory for storing computer programs executable on the processor. The processor is configured to execute the computer programs for implementing steps of the method for transmitting control information which is applied to a sending side such as a base station in the embodiments of the present disclosure. Alternatively, the processor is configured to execute the computer programs for implementing steps of the method for transmitting control information which is applied to a receiving side such as a terminal in the embodiments of the present disclosure.

In this embodiment, the above-mentioned storage medium may include, but is not limited to, a USB flash disk, a ROM, a RAM, a mobile hard disk, a magnetic disk, an optical disk or another medium capable of storing program codes.

Apparently, those skilled in the art should know that each of the above-mentioned modules or steps in the present disclosure may be implemented by a general-purpose computing device, and the modules or steps may be concentrated on a single computing device or distributed on a network composed of multiple computing devices, and may be implemented by program codes executable by the computing devices, so that the modules or steps may be stored in a storage device and executed by the computing devices. In addition, in some cases, the shown or described steps may be executed in sequences different from those described herein, or the modules or steps may be made into various integrated circuit modules separately, or multiple modules or steps therein may be made into a single integrated circuit module for implementation. In this way, the present disclosure is not limited to any combination of hardware and software.

What is claimed is:

1. A method for transmitting control information, comprising:
    configuring the control information, wherein the control information comprises at least one of the following:

configuration information of a physical uplink control channel (PUCCH) resource for channel quality indication (CQI) feedback, wherein the PUCCH resource comprises a first PUCCH resource and a second PUCCH resource, wherein a length of the first PUCCH resource is greater than a length of the second PUCCH resource, the first PUCCH resource is used for a CQI feedback of a target block error rate (BLER) of 10%, and the second PUCCH resource is used for a CQI feedback of a target BLER of less than or equal to 10%;

resource allocation information for indicating time domain resource allocation; or indication information for indicating whether to send in a data region downlink control information (DCI) related to the CQI feedback; and sending the control information.

2. The method of claim 1, wherein sending the control information comprises:

sending the first PUCCH resource through radio resource control (RRC) signaling; and sending the second PUCCH resource through at least one of higher-layer signaling or a downlink control channel.

3. The method of claim 1, wherein after sending the control information, the method further comprises:

receiving a CQI periodically fed back by a terminal on the first PUCCH resource; or receiving a CQI instantaneously fed back by the terminal on the second PUCCH resource.

4. The method of claim 1, wherein the resource allocation information comprises a resource allocation header, wherein the resource allocation header is used for indicating whether the resource allocation information comprises information for indicating the time domain resource allocation.

5. The method of claim 4, wherein a determination mode of the time domain resource allocation comprises at least one of:

indicating the time domain resource allocation through the information of the time domain resource allocation; or determining the time domain resource allocation according to a pre-agreed time domain length.

6. The method of claim 4, wherein different types of resource allocation information occupy a same length.

7. The method of claim 5, wherein in a case of comprising the information of the time domain resource allocation, the method further comprises:

increasing frequency domain resource allocation granularity.

8. The method of claim 1, further comprising:

determining whether to send in the data region the DCI related to the CQI feedback according to indication information related to the CQI feedback in a control region.

9. The method of claim 8, wherein the DCI related to the CQI feedback and sent in the data region comprises at least one of: timing information of the CQI feedback, indication information of the PUCCH resource for bearing the CQI feedback, or indication information of a target block error rate, BLER, corresponding to the CQI feedback.

10. A method for transmitting control information, comprising:

receiving the control information, wherein the control information comprises at least one of the following:

configuration information of a physical uplink control channel (PUCCH) resource for channel quality indication (CQI) feedback, wherein the PUCCH resource comprises a first PUCCH resource and a second PUCCH resource, wherein a length of the first PUCCH resource is greater than a length of the second PUCCH resource, the first PUCCH resource is used for a CQI feedback of a target block error rate (BLER) of 10%, and the second PUCCH resource is used for a CQI feedback of a target BLER of less than or equal to 10%;

resource allocation information for indicating time domain allocation; or indication information for indicating whether to send in a data region downlink control information (DCI) related to the CQI feedback; and performing communication according to the control information.

11. The method of claim 10, wherein the PUCCH resource comprises a first PUCCH resource and a second PUCCH resource, wherein a length of the first PUCCH resource is greater than a length of the second PUCCH resource;

wherein the resource allocation information comprises a resource allocation header, wherein the resource allocation header is used for indicating whether the resource allocation information comprises information for indicating the time domain resource allocation.

12. The method of claim 11, further comprising:

determining whether to send in the data region the DCI related to the CQI feedback in the data region is determined according to indication information related to the CQI feedback in a control region.

13. A device for transmitting control information, applied to a base station, comprising: a processor and a memory, wherein the memory stores processor-executable programs, the processor-executable programs, when executed by the processor, comprise:

a configuration module, which is configured to configure the control information, wherein the control information comprises at least one of the following:

configuration information of a physical uplink control channel (PUCCH) resource for channel quality indication (CQI) feedback, wherein the PUCCH resource comprises a first PUCCH resource and a second PUCCH resource, wherein a length of the first PUCCH resource is greater than a length of the second PUCCH resource, the first PUCCH resource is used for a CQI feedback of a target block error rate (BLER) of 10%, and the second PUCCH resource is used for a CQI feedback of a target BLER of less than or equal to 10%;

resource allocation information for indicating time domain resource allocation; or indication information for indicating whether to send in a data region downlink control information (DCI) related to the CQI feedback; and a sending module, which is configured to send the control information.

14. The device of claim 13, wherein the PUCCH resource comprises a first PUCCH resource and a second PUCCH resource, wherein a length of the first PUCCH resource is greater than a length of the second PUCCH resource;

wherein the processor-executable programs, when executed by the processor, further comprise:

a first sending unit, which is configured to send the first PUCCH resource through radio resource control (RRC) signaling; and a second sending unit, which is configured to send the second PUCCH resource through at least one of higher-layer signaling or a downlink control channel.

15. The device of claim 13, wherein the resource allocation information comprises a resource allocation header, wherein the resource allocation header is used for indicating whether the resource allocation information comprises information for indicating the time domain resource allocation.

16. The device of claim 13, wherein the instructions, when executed by the processor, are further configured to determine whether to send in the data region the DCI related to the CQI feedback according to indication information related to the CQI feedback in a control region.

17. A device for transmitting control information, applied to a terminal, comprising: a processor, and a memory, wherein the memory stores processor-executable programs for executing the method for transmitting control information of claim 10.

18. A non-transitory computer-readable storage medium, which is configured to store computer programs, wherein the computer programs, when executed by a processor, implement steps of the method for transmitting control information of claim 1.

19. A non-transitory computer-readable storage medium, which is configured to store computer programs, wherein the computer programs, when executed by a processor, implement steps of the method for transmitting control information of claim 10.

* * * * *